United States Patent

Whittier, II et al.

[11] Patent Number: 6,003,565
[45] Date of Patent: Dec. 21, 1999

[54] WOVEN FIBERGLASS CABLE WRAP

[75] Inventors: Benjamin L. Whittier, II, Lynchburg, Va.; Robert J. Dunnagan, Greensboro, N.C.; Blair W. Jenkins, Greensboro, N.C.; William C. Schwartz, Greensboro, N.C.

[73] Assignee: BGF Industries, Inc., Greensboro, N.C.

[21] Appl. No.: 09/031,436

[22] Filed: Feb. 26, 1998

[51] Int. Cl.$^6$ ............................ D03D 15/00; D03D 15/12
[52] U.S. Cl. ................. 139/420 A; 385/102; 174/122 R; 174/122 G; 428/304.4
[58] Field of Search ...................... 139/420 A; 385/102; 174/122 R, 122 G; 428/304.4

[56] References Cited

U.S. PATENT DOCUMENTS

| | | |
|---|---|---|
| 4,605,818 | 8/1986 | Arroy et al. . |
| 4,644,098 | 2/1987 | Norris et al. ............................ 174/115 |
| 4,772,091 | 9/1988 | Oestreich . |
| 4,881,794 | 11/1989 | Bartoszek . |
| 4,913,517 | 4/1990 | Arroyo et al. . |
| 5,039,197 | 8/1991 | Rawlyk . |
| 5,131,064 | 7/1992 | Arroyo et al. . |
| 5,133,034 | 7/1992 | Arroyo et al. . |
| 5,149,335 | 9/1992 | Kellenberger et al. ................. 604/372 |
| 5,188,883 | 2/1993 | Rawlyk . |
| 5,373,100 | 12/1994 | Arroyo et al. . |
| 5,377,290 | 12/1994 | Ohta et al. . |
| 5,384,879 | 1/1995 | Nemphos et al. . |
| 5,388,175 | 2/1995 | Clarke . |
| 5,433,994 | 7/1995 | McKinney et al. ..................... 428/246 |

*Primary Examiner*—Andy Falik
*Attorney, Agent, or Firm*—Rhodes & Mason, P.L.L.C.

[57] ABSTRACT

A cable wrap fabric for protecting a communications cable is woven of fiberglass yarns plied with or without low melt thermoplastic yarns, and water swellable superabsorbent yarns. The water swellable superabsorbent yarns are interspersed at spaced intervals within the fiberglass yarns. The fiberglass yarns dissipate heat energy created by lightning strikes or excessive thermal shocks. The superabsorbent water swellable yarns block the progression of water through the cable. The low melt thermoplastic yarns, if used, fuse the other component yarns of the fabric together so that the fabric can be slit into the required tape widths without excessive yarn fraying at the edges.

28 Claims, 4 Drawing Sheets

WOVEN FIBERGLASS CABLE WRAP

FIELD OF THE INVENTION

The present invention relates to a wrap for protecting a communications cable, more particularly, to a woven cable wrap fabric constructed of fiberglass yarns, superabsorbent water swellable yarns and low melt thermoplastic yarns.

BACKGROUND OF THE INVENTION

Communications cables are used throughout the world for transmitting information over long distances. These cables are exposed to many conditions which can damage the core including heat, cold, snow, and rain, in addition to thermal shocks caused by lightning strikes and power surges. To protect against these conditions and prevent the migration of moisture through the cable, a protective woven fabric is commonly wrapped about the core of the cable and acts as a barrier layer against the aforesaid conditions.

The prior art discloses a number of methods of protecting communication cables. Examples of thermal barriers include a multi-ply, thermally stable cladding as short-term protection from high temperatures for the cable core, wrapping the core with a tape sheath of a film or glass cloth impregnated with a fluorinated polymer for improved low smoke and flame retardant properties, or embedding a flame retardant material in the outer plastic cable component for flame retardancy. Examples of water blocking barriers include a water absorption tape composed of a fibrous tape coated with an adhesive and sprinkled with a water swellable powder wound around the outer surface of a spacer in a metal protective tube arrangement, a cable jacketing containing at least one wrap of a backing and facing web with a unique slightly crosslinked aromatic water polymer sandwiched between the two webs, or filling the voids in a cable core with water blocking material. U.S. Pat. Nos. 4,913,517 and 5,373,100 both disclose wrapping water absorptive yarns around critical parts of the cable.

U.S. Pat. No. 5,131,064 issued to Arroyo et. al., herein incorporated by reference in its entirety, discloses a communication cable having a lightning protective thermal barrier layer and a water blocking capability provided by a laminate comprising both a high temperature resistant tape and at least one other tape with a superabsorbent water swellable powder therebetween. In a preferred embodiment, the thermal barrier is constructed of woven glass fabric laminated to and in between two layers of a spunbonded non-woven polyester web with a superabsorbent powder disposed between the polyester webs and the center woven glass. The cable wrap barrier material is manufactured in a wide width and subsequently slit into the desired narrow tape widths depending on the diameter of the cable.

SUMMARY OF THE INVENTION

The cable wrap of the present invention is similar to that described in Arroyo but has novel features which impart improved properties. In each embodiment, the cable wrap includes a woven fabric formed of fiberglass yarns which provides protection against lightning strikes and thermal shocks and superabsorbent water swellable yarns at spaced intervals therein which serve to block moisture progression.

A first embodiment of the invention is directed to a woven fabric formed of fiberglass yarns, low melt thermoplastic yarns plied or otherwise combined together with the fiberglass yarn, and superabsorbent yarns located at spaced intervals within the fabric. The fiberglass protects against heat generated from lightning strikes or thermal shocks, the superabsorbent yarns block the progression of any moisture within the cable, and the low melt thermoplastic yarns fuse the fabric together to reduce fraying or unraveling of the fabric. The term plied used throughout is intended to mean plied, twisted, wrapped or otherwise combined.

Preferably, the cable wrap fabric is woven in a plain weave pattern in which a filling yarn passes successively over and under a warp yarn and then alternating on each of the adjacent rows. The fabric has an air permeability of less than about 0.10 $m^3/m^2$.sec at 124 Pa. to protect the communications cable from being damaged by severe conditions.

The superabsorbent water swellable yarns have a denier in the range of about 500 to 1,000, and preferably within the range of 750 to 900. These superabsorbent water swellable yarns are preferably woven in bands spaced at least about one inch apart throughout the fabric and the bands may extend in either the fill or the warp directions. The superabsorbent water swellable yarns forming the band may be woven in a plain or rib weave pattern in which a filling yarn passes successively over and under adjacent warp yarns and alternates on each row. When the superabsorbent water swellable yarn is woven in the fill of the rib pattern, at least two adjacent superabsorbent water swellable yarns pass over and under the same warp yarns across the weave pattern. When placed in the warp direction, each fill yarn passes over or under at least two adjacent superabsorbent water swellable warp yarns across the weave pattern. Although these weave patterns are specifically mentioned, it is understood that a variety of weave patterns may be used for the present invention.

The low melt thermoplastic yarn is preferably either polyethylene, polypropylene, polyester, ethylene vinylacetate, or a hybrid of the above materials coated with a polyethylene or ethylene vinylacetate polymer on the surface. These yarns preferably have a denier in the range of about 150 to 500. The low melt thermoplastic yarns may be plied with the fiberglass yarns in the range of about 1.5 to 4.5 twists per inch. The cable wrap fabric containing the low melt thermoplastic yarn is preferably fused on the loom by running the fabric through a heating zone having a temperature of about 180 to 300° F. to melt the thermoplastic yarns. The thermoplastic yarns prevent cut or slit edges of the fabric from fraying and unraveling. The low melt thermoplastic yarn may also be plied with the superabsorbent water swellable yarn.

In a second embodiment, the fiberglass yarns are not plied with a low melt thermoplastic yarn. Thus there are only fiberglass yarns and superabsorbent yarns. This embodiment is similar and has the same physical properties as the previous embodiment except for the absence of the low melt thermoplastic yarn. This embodiment is preferably used when the fabric will not be slit so there will be no edges to fray and unravel. The superabsorbent yarn may again be woven into the fabric in either the warp or fill direction, and further may be woven in bands having a number of superabsorbent yarns in a side-by-side arrangement.

A primary object of the present invention is to provide an improved cable wrap for protecting a communications cable.

Another object of the present invention is to produce a cable wrap product with physical properties such as low air permeability, thermal protection, and resistance to moisture.

Yet another object of the present invention is to provide a cable wrap of the type described which has less fraying and yarn raveling at the edges of the tape, particularly when the cable wrap is slit into various widths.

DETAILED DESCRIPTION OF THE INVENTION

Figure 1:
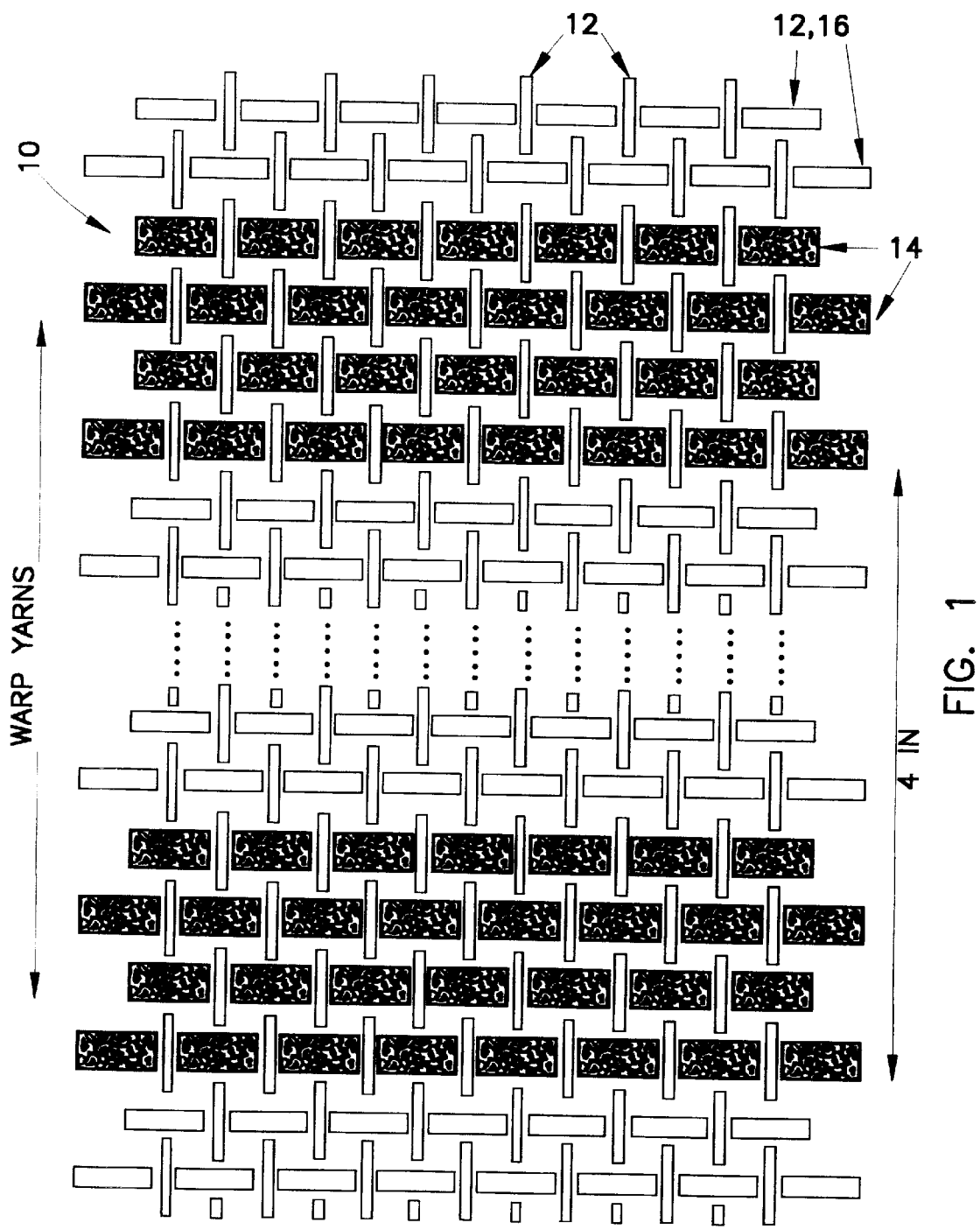
FIG. 1 is a schematic view of a woven cable wrap according to the present invention having fiberglass yarns in both the warp and the fill directions and a repeating pattern of four superabsorbent water swellable yarns in the fill direction in a plain weave pattern in ribbon like bands.

With reference to FIG. 1, a woven cable wrap according to the present invention is shown therein and generally denoted by the numeral 10. The woven cable wrap fabric is constructed of fiberglass yarns 12, superabsorbent water swellable yarns 14 and low melt thermoplastic yarns 16. The fiberglass yarns 12 dissipate heat energy created by lightning strikes or excessive thermal shocks. The superabsorbent water swellable yarns 14 block the progression of water through the cable. The low melt thermoplastic yarns 16 fuse or adhere yarns of the fabric together so that the fabric can be slit into the required tape widths without excessive yarn fraying at the edges.

Weaving is a mechanical process where threads are interlaced at right angles to each other to form a woven fabric. The warp ends or yarns run lengthwise in the fabric. This may be called in cables the longitudinal or machine direction. The filling, fill yarns, or picks run from side to side in the cross machine direction. In a cable, the fill direction is referred to as the transverse direction. Weaving is usually done on a machine called a loom. In designing a fabric for a particular application, the weaver works with such parameters as yarn nomenclature, weave pattern, and fabric construction. The yarn weight, yarn diameter, yarns per inch in the warp and fill direction, and the weave pattern will determine to a great extent the characteristics of thickness, weight, pliability, tensile strength, stability, and appearance of the fabric.

A plain weave pattern is the most simple and commonly used and preferred for this invention. In this type of weave, each filling yarn passes successively over and under each warp yarn, alternating each row. Two, three or even more fill yarns can also be woven as one yarn with the combined fill yarns passing successively over and under each warp yarn, alternating each row forming a pattern with ribs.

Looms are typically set up to weave a fabric with predetermined warp and fill counts, such as for example, 40 ends per inch in the warp and 20 picks per inch in the fill. The warp yarns are usually all identical although warps can be made with two or three different yarns distributed in a precise manner such as 32 ends of yarn A, 8 ends of yarn B; 30 ends of yarn A, 10 ends of yarn B, etc. The fill yarns may be identical to the warp yarns or they can be of a different type, size, or weight. Usually, fill yarns in a given fabric are all the same. However, many modern looms have a filling selector attachment which allows different fill yarns to be woven into the fabric in a desired number at designated intervals. For example, in a fabric with 20 picks per inch, 18 picks may be of type A yarn and the other 2 picks of type B yarn. The loom can also be programmed to weave for example almost three inches or 56 picks of type A yarn followed by 4 picks of type B yarn. Such a fabric would have a filling repeat of three inches. One fundamentally skilled in weaving will realize that many variations and combinations of yarns are possible in weaving even rather simple plain weave fabrics.

In the present invention, the woven cable wrap functions to protect the communications cable that it surrounds from a variety of potential damaging factors. Communications cables may include fiber optic cables or other types of cables having an interior core that is used for carrying signals. The wrap serves as a thermal barrier to protect from temperature extremes and excessive thermal shocks caused by events such as lightning strikes or power surges. Preferably, the fiberglass yarns have a softening temperature of greater than about 700° C. to protect against these conditions. The cable wrap also functions as a mechanical barrier to protect the cable against outside stresses including sudden bending or deformation of the cable which could damage the cable components.

The cable wrap is woven to be sufficiently dense so that there is substantially no passage therethrough of particles of sufficient size which could cause detrimental damage to the cable core. As discussed in U.S. Pat. No. 5,131,064, particles from the cable may be generated from an explosive impact caused by a lightning strike which can cause molten metal particles from the shield or other metallic components of the cable to be driven into the cable core. This attribute of the thermal barrier may be characterized by the air permeability of the wrap which is defined as the rate of air flow through a material under a differential pressure. Preferably, the cable wrap fabric is woven with yarns of such denier and of such warp and fill content that when completed with the low melt thermoplastic yarns fused, the invention has an air permeability of less than about 0.10 $m^3/m^2$.sec at 124 Pa.

The water blocking properties of the present invention are achieved by superabsorbent water swellable yarns woven into the cable wrap fabric. One example of this type of yarn is a 6.25/1 cotton count (850 denier) manufactured by Artofil B.V. in England and is composed of 80% polyester fiber and 20% swellable polyacrylate. The superabsorbent yarns absorb and contain moisture causing the diameter of the yarn to swell. This ensures the moisture is segregated away from the interior of the cable where it could possibly cause damage. Compared to superabsorbent powders or superabsorbent coated yarns, the superabsorbent water swellable yarns of the present invention have less tendency to dust when handled and cut. Less dusting reduces processing problems during the cable manufacturing process. The term superabsorbent is defined in U.S. Pat. Nos. 4,913,517 and 5,373,100, herein incorporated by reference in there entirety.

The superabsorbent water swellable yarns are woven at spaced intervals to absorb moisture. Spaced intervals is defined as any distance between superabsorbent water swellable yarns such as bands spaced at repeating intervals or alternating yarns in the fill or warp. It is understood that the present invention covers the different arrangements of superabsorbent water swellable yarns within fiberglass yarns. Because superabsorbent water swellable yarns are expensive, it is preferred that these yarns be spaced in bands one or more inches apart. Since the cable wrap is typically wrapped longitudinally around the cable core in a manner similar to rolling a cigarette, it may not be necessary to have water blocking capabilities along the entire cable length but only at selected and continual intervals. The presence of water itself within a communication cable is not necessarily detrimental to the performance of the cable, but problems may result when the water travels within the cable interior to connection points or terminals. If by example these points or terminals are designed to be six inches apart, it may suffice to have water blocking capabilities only at four inch intervals in the cable and still have the required protection. FIG. 1 illustrates a cable wrap with this construction having a repeating pattern of four superabsorbent water swellable yarns in the fill direction having a plain weave pattern.

Figure 3:
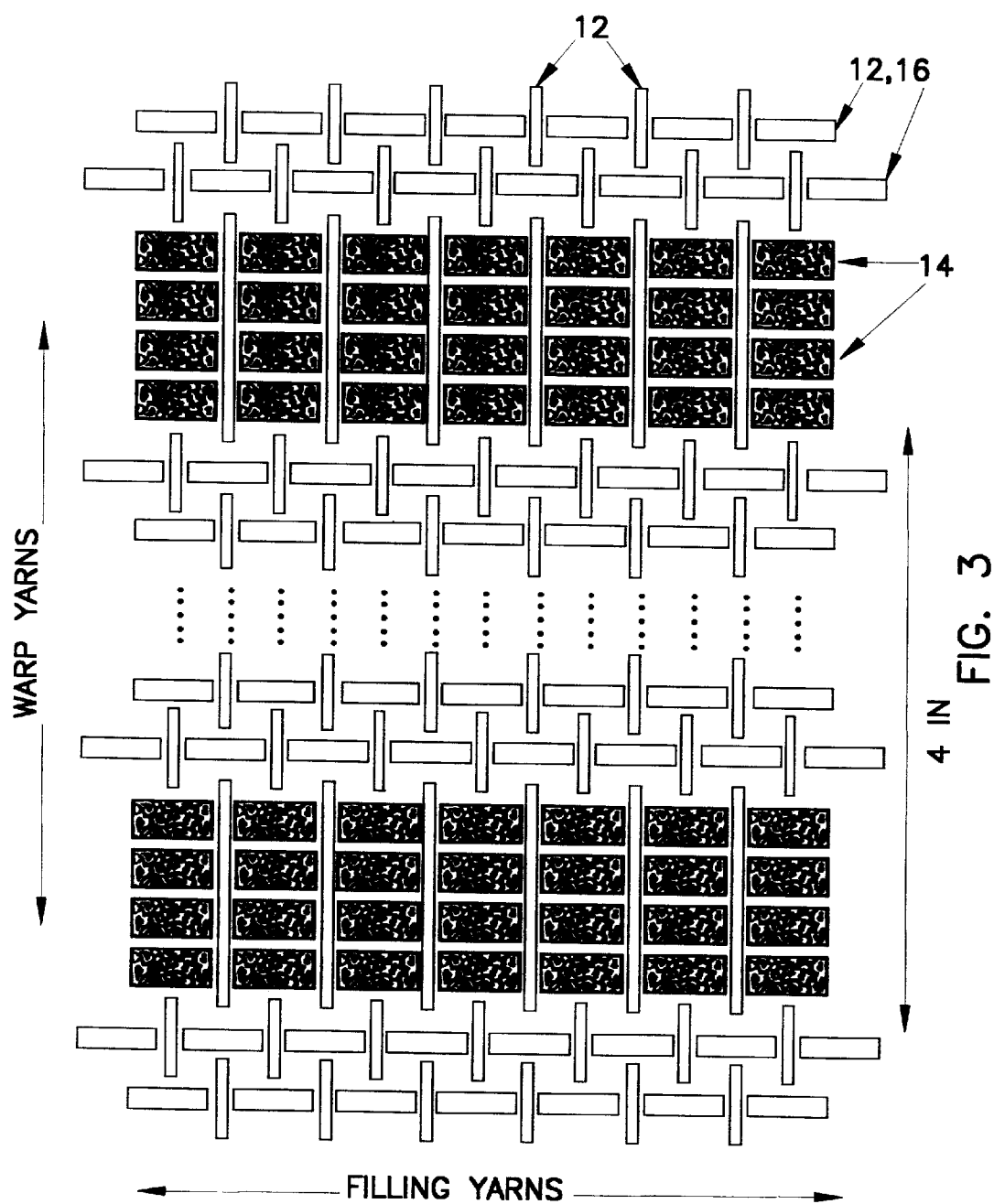
FIG. 3 is a schematic view of a woven cable wrap with a repeating pattern of four superabsorbent water swellable yarns in the fill weaving together as one in ribbon like bands.

FIG. 3 is similar to FIG. 1 except that the four superabsorbent water swellable yarns are woven as one. By weaving the four yarns together, a bulkier and thicker band results which may be more efficient in blocking water in a larger diameter cable. For ease of processing, it is preferred that the portion of the cable wrap fabric containing the superabsorbent water swellable yarns be no thicker than the balance of the fabric.

Figure 2:
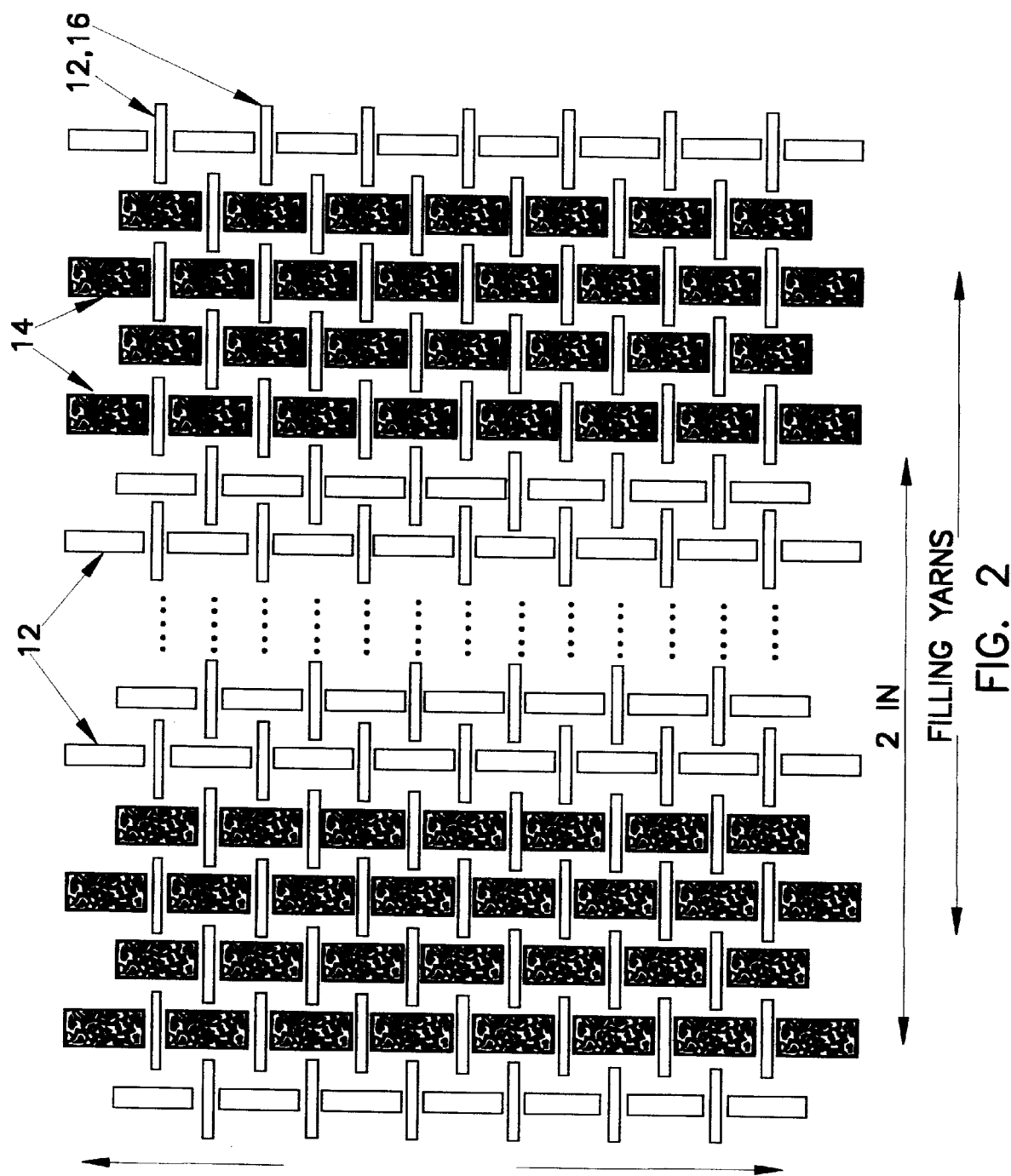
FIG. 2 is a schematic view of a woven cable wrap with a repeating pattern of four superabsorbent water swellable yarns in the warp direction weaving in a plain weave pattern in ribbon like bands.

Some cable may be wrapped helically instead of longitudinally. In this case, it is important that the superabsorbent water swellable yarns be inserted in the warp direction of the fabric at intervals close enough that every slit tape contains enough superabsorbent water swellable yarns to insure that the entire diameter of the cable be protected against moisture. FIG. 2 illustrates a cable wrap in which four superabsorbent water swellable yarns are woven in the warp or longitudinal direction at two inch intervals. FIGS. 1–3 are illustrated to show specific weave patterns for the cable wrap fabric. The present invention, however, is not limited to these patterns but may include a variety of weave patterns.

The superabsorbent water swellable yarns may be of many different sizes and deniers having different capacities to absorb water. A broad range of deniers may be used for the superabsorbent yarns depending upon the specific needs of the fabric. The present invention contemplates a preferred denier in the range of about 500 to 1,000, with a preferred range of about 750–900 denier. Any number of superabsorbent water swellable yarns may be woven adjacent to control the density and absorbency of the fabric.

Figure 4:
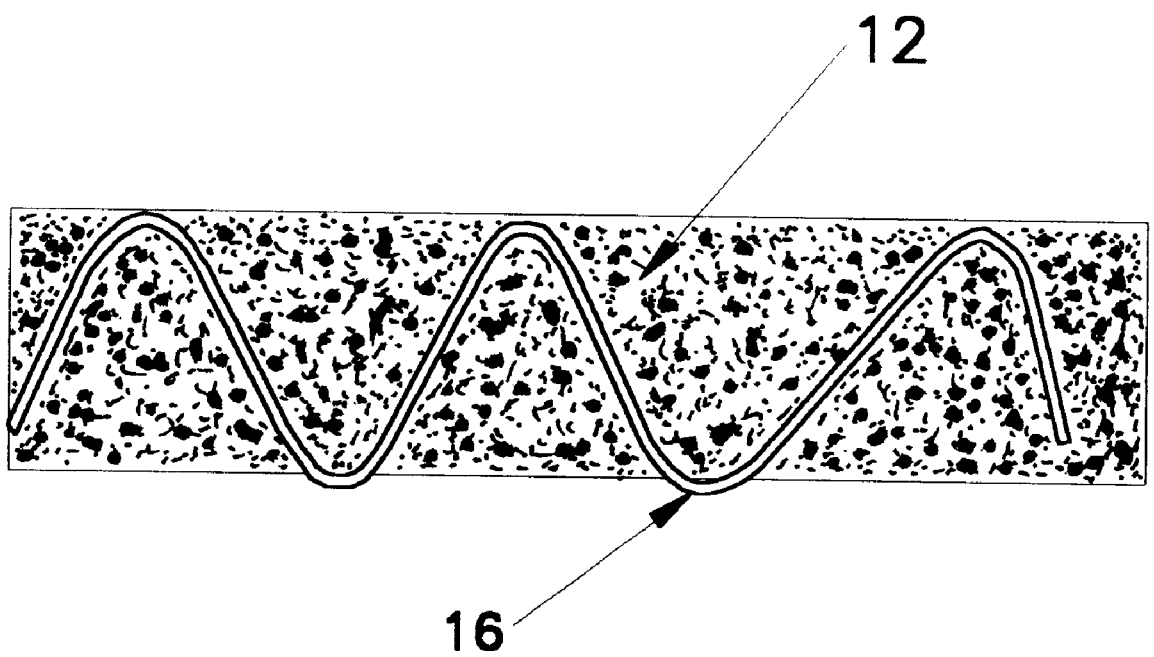
FIG. 4 is a schematic view of a fiberglass yarn and low melt thermoplastic yarn plied together.

The low melt thermoplastic yarn is woven into the cable wrap to reduce the amount of raveling or fraying at the cable wrap edges. The fraying of the edges of the cable wrap is particularly troublesome when the cable wrap is cut or slit as the edges of the fiberglass yarns tend to unravel. In a preferred embodiment, the low melt thermoplastic yarn is plied with the fiberglass yarns prior to being woven into the cable wrap as shown in FIG. 4. The plied fiberglass-low melt thermoplastic yarn is formed by twisting together the two yarns. Preferably, the low melt thermoplastic yarn is twisted about the fiberglass yarn in the range of about 1.5–4.5 twists per inch. In one embodiment, the low melt thermoplastic yarns was twisted about the fiberglass yarn 2.8 twists per inch. The cable wrap having low melt thermoplastic yarns incorporated into the fabric construction provides for the low melt thermoplastic yarns to be on the surface of the fiberglass yarns where adhesion takes place rather than inside of the yarn bundle if the woven fabric is finished in the traditional manner.

Preferred embodiments for the low melt thermoplastic yarn include a low melt thermoplastic such as a low melt thermoplastic polyethylene, polypropylene, polyester, ethylene vinylacetate yarn, or a hybrid yarn in which a percentage of the yarn contains at least one of the above mentioned yarns and further has a coating of polyethylene or ethylene vinylacetate polymer on the surface. These embodiments provide excellent adhesion properties of these polymers with a relatively low temperature required to fuse or melt the yarns. The denier range for the low melt thermoplastic yarns is about 150–500. In one preferred embodiment, a 290 denier polyester/polyethylene hybrid yarn is used in the fabric.

The low melt thermoplastic yarn is preferably plied with the fiberglass yarns to reduce the amount of fraying and raveling of the fabric. FIGS. 1, 2, and 3 illustrate the low melt thermoplastic yarn plied with the fiberglass yarn that extend in the fill direction. The low melt thermoplastic yarns may also be plied with the fiberglass yarns that extend in the warp direction. The low melt thermoplastic yarn may also be plied with the superabsorbent water swellable yarns whether in the warp direction, fill direction, or both. Combining the yarns provides for introducing the low melt thermoplastic into the weave pattern at the necessary intervals to reduce fraying and raveling of the fabric.

The cable wrap fabric may be heated or fused on the loom by passing the woven fabric through a small radiant heater on the take-up end of the loom, thereby by saving an extra processing step such as by heating or fusing the fabric in a separate operation. The heat necessary to fuse the cable wrap is in the range of about 180–300° F.

The low melt thermoplastic yarn may not be necessary when the fabric will not be slit and the weaving process results in a pattern having substantially no frayed edges. In one embodiment, the cable wrap is woven to the desired width on a tape loom made by Mueller, Jakob of America, Inc., of Charlotte, N.C. As the fabric will not be slit and the weave pattern reduces the amount of edge raveling, a low melt thermoplastic yarn is not required. The superabsorbent yarns in this embodiment are positioned at spaced intervals throughout the fabric. This embodiment should also have an air permeability of less than about 0.10 $m^3/m^2$.sec at 124 Pa.

EXAMPLE 1

A fabric of this invention identified as sample style 1-9828/38"/001 and illustrated in FIG. 1 was woven with the following construction:

| | |
|---|---|
| Pattern: | plain |
| Warp: | ECG 75 1/0 Fiberglass yarn (from PPG Industries - Lexington, NC) |
| Fill | ECG 75 1/0 Fiberglass yarn plied at 2.8 twists per inch with 290 denier low melt polyester/polyethylene thermoplastic yarn (from Hoechst Celanese - Spartanburg, SC) and Superabsorbent 850 denier core-spun yarn (from Artofil B.V. - England) |
| Count: | Warp - 44 ends per inch<br>Fill - 32 ends per inch with 4 picks of superabsorbent yarn weaving adjacent at 4 inch intervals. For each 4 inch repeat, there are 124 adjacent picks of glass/low melt yarns and 4 adjacent picks of superabsorbent yarns |

The above construction was woven on a Dornier rapier loom with a filling selector motion which allows filling yarns to be interchanged at selected intervals. The fabric was fused on the loom with radiant heat by passing the fabric through a radiant heat oven before it was wound on the on-loom take up roll.

When compared to a commercial cable wrap made from woven glass laminated on both sides to non-woven polyester webs with superabsorbent powder therebetween, the product of the Example 1 compares favorably as shown below:

|  | I-9828/38"/001 | Woven glass/Polyester Laminated |
|---|---|---|
| Total Weight (OSY): | 7.5 | 8.0 |
| Glass weight: | 6.2 | 6.3 |
| Superabsorbent Yarn weight: | 0.115 | — |
| Low melt yarn weight: | 1.2 | — |
| Thickness (in.): | 0.010–0.013 | 0.012–0.014 |
| Tensiles (lbs/in): | 250 × 230 | 250 × 230 |
| Porosity (ft$^3$/min/ft$^2$): | 2.0–5.0 | 14–35 |
| Edge Adhesion: | 200 grams | 70 grams |

Weight—OSY—ounces per square yard ASTM D579
Thickness—per ASTM D579
Tensiles—breaking strength expressed in pounds per inch of fabric width
Porosity—amount of air passing through fabric expressed as cubic feet per minute per square foot
Edge Adhesion—the force expressed in grams to pull out the first edge of yarn of a fabric or tape The fabric of Example 1 is also expected to compare favorably with the woven glass/polyester laminated product in thermal protection and has a greater moisture absorption and water blocking capability than a fabric without a superabsorbent water swellable yarn.

The edge adhesion test used an Instron with 50 lbs. Load roll and small clamps. Three samples, 6 inches on edge by 2 inches on edge are cut from a sample fabric. A small thread was placed under the first full yarn of the edge in the center of the 6 inch on the edge. The sample was put in the Instron and the thread was pulled until the first yarn was pulled out of the edge. The clamps on the Instron were set 4 inches apart as the Instron was run at 5.0 in. per mon. speed. The peak load was recorded.

EXAMPLE 2

A fabric identified as sample style I-9829/38"/004 was woven with the following construction:

| Pattern: | plain |
|---|---|
| Warp: | ECG 75 1/0 Fiberglass yarn |
| Fill: | ECG 75 1/0 Fiberglass yarn plied at 2.8 twists per inch with 290 denier low melt polyester/polyethylene thermoplastic yarn and Superabsorbent 850 denier core spun yarn |
| Count: | Warp - 44 ends per inch Fill - 32 picks per inch with 8 superabsorbent yarns weaving adjacent at two inch intervals. For each two inch repeat, there are 56 adjacent picks of fiberglass/low melt yarn and 8 adjacent picks of superabsorbent yarns. |

The above construction was woven on a Dornier rapier loom with a filling selector motion and fused on the loom as in Example 1.

The fabric of Example 2 has the following properties:

| Total Weight (OSY): | 7.4 |
|---|---|
| Glass weight: | 6.0 |
| Superabsorbent Yarn weight: | 0.46 |
| Low melt yarn weight: | 1.37 |
| Thickness (in.): | 0.010–0.013 |
| Tensiles (lbs/in): | 250 × 220 |
| Porosity (ft$^3$/min/ft$^2$): | 2.0–5.0 |
| Edge Adhesion: | 200 grams |

As Example 2 has four times the weight of superabsorbent yarns as compared to Example 1, it will absorb more water or moisture. The fabric of Example 2 is expected to compare favorably in thermal protection and has a better moisture absorption and moisture blocking than a fabric without a superabsorbent water swellable yarn.

It is expected that a woven fabric of fiberglass yarns and superabsorbent water swellable yarns will have properties similar to the previous examples except for the edge adhesion.

It will be understood that variations of the product of this invention can be readily devised by those skilled in the art but such variations are not to be regarded as a departure from the scope of spirit of the invention and are intended to be included within the scope of the following claims.

What is claimed is:

1. A cable wrap fabric for protecting a communications cable comprising a fabric formed of fiberglass yarns, low melt thermoplastic yarns and superabsorbent water swellable yarns, said yarns being woven together into a fabric with said superabsorbent water swellable yarns occurring at spaced intervals within said fabric.

2. The product of claim 1, wherein said cable wrap fabric is adapted to be wrapped around a fiber optic cable of protection against thermal shocks and moisture running through the length of said cable.

3. The product of claim 1, wherein said cable wrap fabric is woven in a plain weave pattern in which a filling yarn passes successively over and under adjacent warp yarns and alternating on each adjacent row.

4. The product of claim 3, wherein said superabsorbent water swellable yarns occur in the fill direction.

5. The product of claim 3, wherein said superabsorbent water swellable yarns occur in the warp direction.

6. The product of claim 1, wherein said superabsorbent water swellable yarns occur in spaced bands located through said fabric wherein at least two adjacent superabsorbent water swellable fill yarns pass over and under the same warp yarns.

7. The product of claim 1, wherein said superabsorbent water swellable yarns occur in spaced bands located throughout said fabric where each fill yarn passes over or under at least two adjacent superabsorbent water swellable warp yarns.

8. The product of claim 6 or 7, wherein said bands are about one-quarter inch wide and about one inch apart.

9. The product of claim 1, wherein said cable wrap fabric has an air permeability of less than about 0.10 m$^3$/m$^2$.sec at 124 Pa.

10. The product of claim 1, wherein said superabsorbent water swellable yarns have a denier between about 500 and 1,000.

11. The product of claim 1, wherein said superabsorbent water swellable yarns have a denier between about 750 and 900.

12. The product of claim 1, wherein said low melt thermoplastic yarn is selected from the group consisting of polyethylene; polypropylene; polyester; ethylene vinylacetate; hybrid yarn containing at least one of the above mentioned materials coated with polyethylene polymer on the surface; and hybrid yarn containing at least one the above mentioned materials coated with ethylene vinylacetate polymer on the surface.

13. The product of claim 1, wherein said low melt thermoplastic yarn has a denier between about 150 and 500.

14. The product of claim 13, wherein said low melt thermoplastic yarn is plied with said fiberglass yarn between about 1.5 and 4.5 twists per inch.

15. The product of claim 14, produced by the method wherein said cable wrap fabric is fused on the loom at a temperature between about 180 and 300° F.

16. The product of claim 1, wherein said cable wrap fabric has a count of about 44 ends per inch in the warp and about 32 ends per inch in the fill.

17. The product of claim 1, wherein said low melt thermoplastic is plied with said superaborbent water swellable yarn.

18. A cable wrap for protecting a communication cable comprising a woven fabric formed of fiberglass yarn and superabsorbent water swellable yarn positioned at spaced intervals in said fabric.

19. The product of claim 18, wherein said cable wrap fabric is adapted to be wrapped around a fiber optic cable for protection against thermal shocks and moisture running through the length of the cable.

20. The product of claim 18, wherein said cable wrap fabric is woven in a plain weave pattern in which a filling yarn passes successively over and under adjacent warp yarns and alternating on each adjacent row.

21. The product of claim 20, wherein said superabsorbent water swellable yarns occur in the fill direction.

22. The product of claim 20, wherein said superabsorbent water swellable yarns occur in the warp direction.

23. The product of claim 18, wherein said superabsorbent water swellable yarns occur in spaced bands located throughout said fabric wherein at least two adjacent superabsorbent water swellable fill yarns pass over and under the same warp yarns across the weave pattern.

24. The product of claim 18, wherein said superabsorbent water swellable yarns occur in spaced bands located throughout said fabric wherein each fill yarn passes over or under at least two adjacent superabsorbent water swellable warp yarns across the weave pattern.

25. The product of claim 23 or 24, wherein said bands are spaced at least about one inch apart.

26. The product of claim 18, wherein said superabsorbent water swellable yarns have a denier between about 500 and 1,000.

27. The product of claim 18, wherein said superabsorbent water swellable yarns have a denier between about 750 and 900.

28. The product of claim 18, wherein said cable wrap fabric has a count of about 44 ends per inch in the warp and about 32 ends per inch in the fill.

* * * * *